F. C. KUTT.
Car Starter.
No. 29,700.  Patented Aug. 21, 1860.
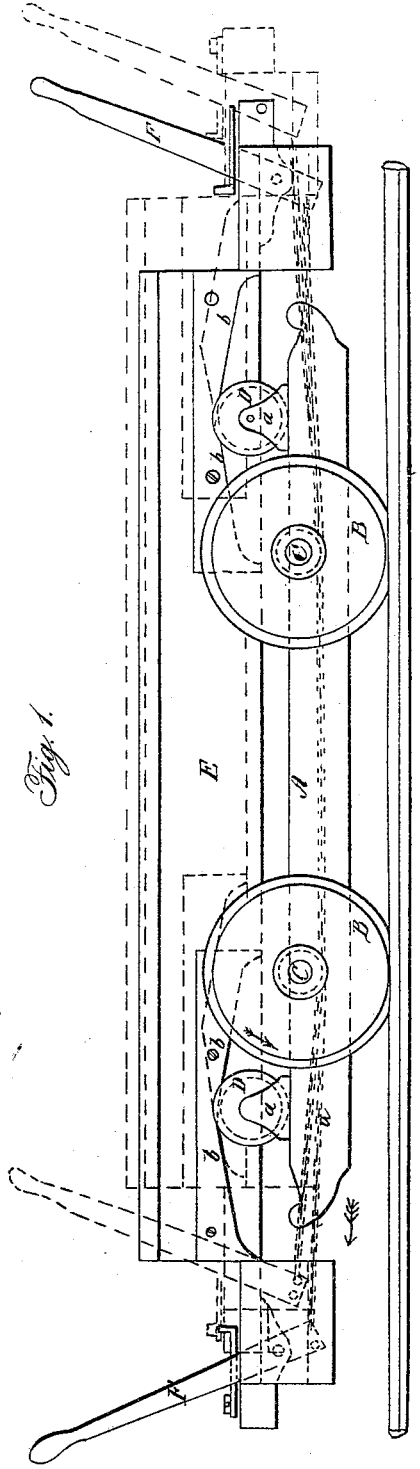
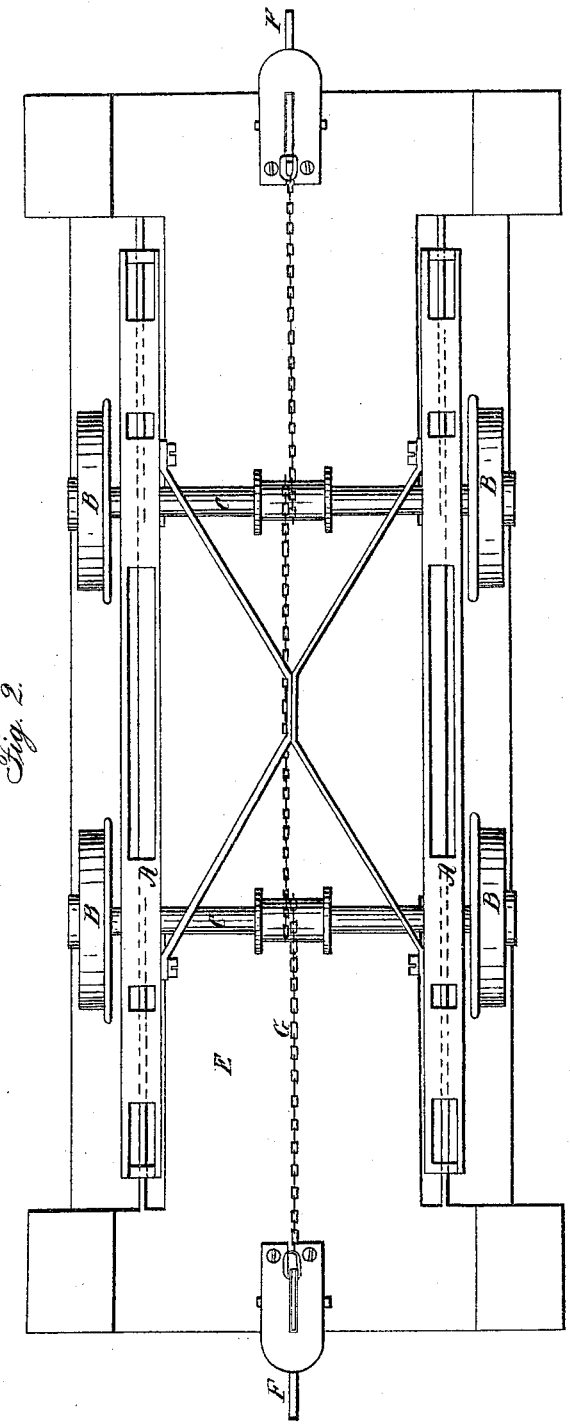
Witnesses:
Inventor:

UNITED STATES PATENT OFFICE.

F. C. KUTT, OF HACKENSACK, NEW JERSEY.

STOPPING AND STARTING RAILROAD-CARS.

Specification of Letters Patent No. 29,700, dated August 21, 1860.

*To all whom it may concern:*

Be it known that I, F. C. KUTT, of Hackensack, in the county of Bergen and State of New Jersey, have invented a new and Improved Device for Stopping and Starting Railroad-Cars; and I do hereby declare that the following is a full, clear, and exact description of the same, reference being had to the accompanying drawing, forming a part of this specification, in which—

Figure 1, represents a side elevation of this invention. Fig. 2, is an inverted plan of the same.

Similar letters of reference in both views indicate corresponding parts.

The object of this invention is to take advantage of the momentum acquired by a car while in motion and applying it to the stopping and starting of the car, so that if the car is alternately started and stopped, the momentum acquired in stopping the car assists the animals drawing the car in starting it from a dead stand.

My invention consists in arranging on the body of a car a series of double inclined planes resting on friction rollers, which have their bearings in lugs or standards projecting up from the truck frame in such a manner, that when the car is suddenly stopped by applying a chain brake to the axles, the body of the car will be moved backward and up the inclined planes where it is held until the car is to start and on releasing the brakes again the body of the car will move forward down the inclined planes and impart its momentum to the wheels so as to start them and to enable the horses to proceed with comparative ease.

To enable those skilled in the art to make and use my invention, I will proceed to describe its construction and operation with reference to the drawing.

The truck frame A of my car is supported by the axles C, of four wheels B, in the usual manner. The truck frame is furnished with four (more or less) double flanged friction rollers D, the axles of which have their bearings in lugs or standards a, which project upward from the ends of the truck frame as clearly shown in Fig. 1. These rollers form the support for the body E, of the car, the latter being provided on its side timbers with double inclined planes b, b, which rest on the rollers. Said inclined planes are formed by attaching to the sides of the car body iron plates cut out to the required shape and of such a width that they fit nicely between the flanges of the rollers D, said flanges preventing a side motion of the car body. The highest points of the lower edges of the plates which form the inclined planes b, b, are in the centers of these plates and just where the inclined planes meet and they are at such distances apart, that if the car is standing still, and free to follow its own gravity, it adjusts itself so that the points where the inclined planes meet, stand right over the centers of the rollers D.

The body E, of the car is provided with two brake levers F, one at each end. These levers are connected by a chain G, which winds once or oftener around the middle part of each of the axles C of the wheels, said axles being provided with two rings or shoulders, one on each side of its middle, to keep the chain properly in line. This chain forms the only connection between the truck and the body of the car, and as long as the chain is slack the car body is free to move in a longitudinal direction either way. But if the car body is supposed to be in motion in the direction marked near it in Fig. 1, and if it is desired to stop the same and if now the brake lever in the front end of the car is forced backward so as to exert a strain on the chain the friction of the chain on the axle will prevent it slipping on the same and the latter, which by its momentum continues to move in a forward direction as indicated by the arrow marked on it in Fig. 1, winds itself up on the chain, thus shortening the distance between the axle and the brake lever on the front end of the car and causing the body of the car to move up the inclined planes b, b and assume a position in relation to the truck as indicated by red outlines in Fig. 1, and by the time the car body has moved all the way up said inclined planes, the strain exerted on the chain and its friction on the axle increases to such an extent that it acts as a powerful brake and causes the car to stop.

On releasing the brake lever, the body of the car impelled by its own gravity, runs down the inclined planes, and it assists thereby in starting the car.

This arrangement is very simple, cheap and durable and its effect is such that the momentum acquired by the car while in motion is controlled and applied in such a manner that the stopping as well as the starting of the car is effected with comparative ease and at the same time the horses are not required to start the car from a stand, nor to stop the same when it is desired to bring it to a stand.

What I claim as new and desire to secure by Letters Patent is—

1. The arrangement of the inclined planes $b, b$, on a car body in combination with friction rollers D or their equivalents constructed and operating substantially as and for the purpose herein specified.

2. The combination with the car body E, upon inclined planes $b, b$, and rollers D of a chain brake G, constructed and operating substantially as and for the purpose set forth.

F. CHR. KUTT.

Witnesses:
B. GIROUSE,
JNO. H. SCOTT.